United States Patent [19]
Gravely

[11] 4,416,258
[45] Nov. 22, 1983

[54] HEAT STORAGE MEANS

[76] Inventor: Benjamin T. Gravely, 7001 Buckhead Dr., Raleigh, N.C. 27602

[21] Appl. No.: 287,094

[22] Filed: Jul. 24, 1981

Related U.S. Application Data

[63] Continuation of Ser. No. 8,437, Feb. 1, 1979.

[51] Int. Cl.³ .................................................. F24J 3/02
[52] U.S. Cl. ..................................... 126/428; 126/435; 126/437; 165/104.19; 165/132; 165/DIG. 24; 165/47
[58] Field of Search .................. 165/132, 104.19, 108, 165/DIG. 24, 104.32, 47; 126/400, 432, 435, 437, 428; 237/19; 62/238.6

[56] References Cited

U.S. PATENT DOCUMENTS

| | | | |
|---|---|---|---|
| 2,162,245 | 6/1939 | Comstock | 62/238.6 X |
| 2,343,856 | 3/1944 | Tidd | 237/19 |
| 2,522,948 | 9/1950 | Hoffmann | 165/108 X |
| 2,632,306 | 3/1953 | Ruff | 62/238.6 X |
| 4,008,709 | 2/1977 | Jardine | 126/435 X |
| 4,119,086 | 10/1978 | Brussels | 126/400 X |
| 4,143,642 | 3/1979 | Beaulieu | 126/435 |

FOREIGN PATENT DOCUMENTS 2540004  3/1977  Fed. Rep. of Germany ..... 62/238.6

*Primary Examiner*—Albert W. Davis, Jr.
*Attorney, Agent, or Firm*—Mills & Coats

[57] ABSTRACT

In abstract, a preferred embodiment of this invention is a heat storage tank particularly adapted for use in conjunction with solar energy systems. The tank is insulated about its entire exterior with control means being mounted in a special compartment within the tank. The heat generated by the controls is thus put to useful purposes rather than being dissipated into the ambient air. Also, a unique venting system is provided so that atmospheric pressure can be maintained within the tank without loss of the fluid therein due to evaporation.

11 Claims, 3 Drawing Figures

HEAT STORAGE MEANS

This is a continuation, of application Ser. No. 008,437, filed Feb. 1, 1979.

FIELD OF INVENTION

This invention relates to stoage systems and more particularly to storage tanks adapted for use in conjunction with solar and other types of energy systems.

BACKGROUND OF THE INVENTION

Since man first began using heted liquids such as water for domestic and commercial purposes, he has had problems, first in heating the liquid and secondly in storing it once heated until it is used.

Before the advent of electric and gas fired heating means, pipes were disposed within a wood or coal stove or fire box and the water or other liquid pumped therefrom into an uninsulated tank. The heat loss and inefficiency of these systems were great and such inefficiency cannot be tolerated in the modern environment.

In more recent times, various methods have been used for heavily insulating tanks or reservoirs for storing heated liquids. These systems have been constructed of various materials and have been formed in various configurations. In many instances, pumps, solenoids, thermostats and other controls have been mounted within an exterior shell for aesthetic purposes. It has always been though necessary, however, to locate these controls exteriorly of the insulated portion of the reservoir for more ready access and also for heat dissipation purposes. Also, vents to allow atmospheric pressure equilibrium in nonpressurized applications have been vented directly to the exterior of the tank with resultant loss of not only heat but of liquid through evaporation.

BRIEF DESCRIPTION OF INVENTION

After much research and study into the above-mentioned problems, the present invention has been developed to provide an insulated liquid storage reservoir wherein all controls are mounted within the insulated portion thereof. A unique vent system is also provided which allows atmospheric pressure to be maintained within the tank without allowing heat loss through the vent system and also eliminating evaporative liquid loss therethrough.

This storage system also allows the heat generated by the controls to be used to heat and/or maintain the temperature level within the insulated enclosure. The present highly efficient liquid storage means is particularly adapted for use in conjunction with the solar energy systems presently available and being developed.

In view of the above, it is an object of the present invention to provide an insulated liquid storage reservoir wherein all controls are mounted within the insulated portion thereof.

Another object of the present invention is to provide a heat storage reservoir wherein the controls for the same are mounted within the insulated interior thereof.

Another object of the present invention is to utilize the heat generated by various types of controls for heating or maintaining the temperature of the heat storage means in conjunction with which such controls are used.

Another object of the present invention is to provide an improved heat exchange system for use in conjunction with a heat storage reservoir.

Another object of the present invention is to provide, in a nonpressurized heat storage reservoir, an improved venting means for preventing loss of both the heat and liquid contained therein.

Other objects and advantages of the present invention will become apparent and obvious from a study of the following description and the accompanying drawings which are merely illustrative of such invention.

DETAILED DESCRIPTION OF INVENTION

Figure 1:
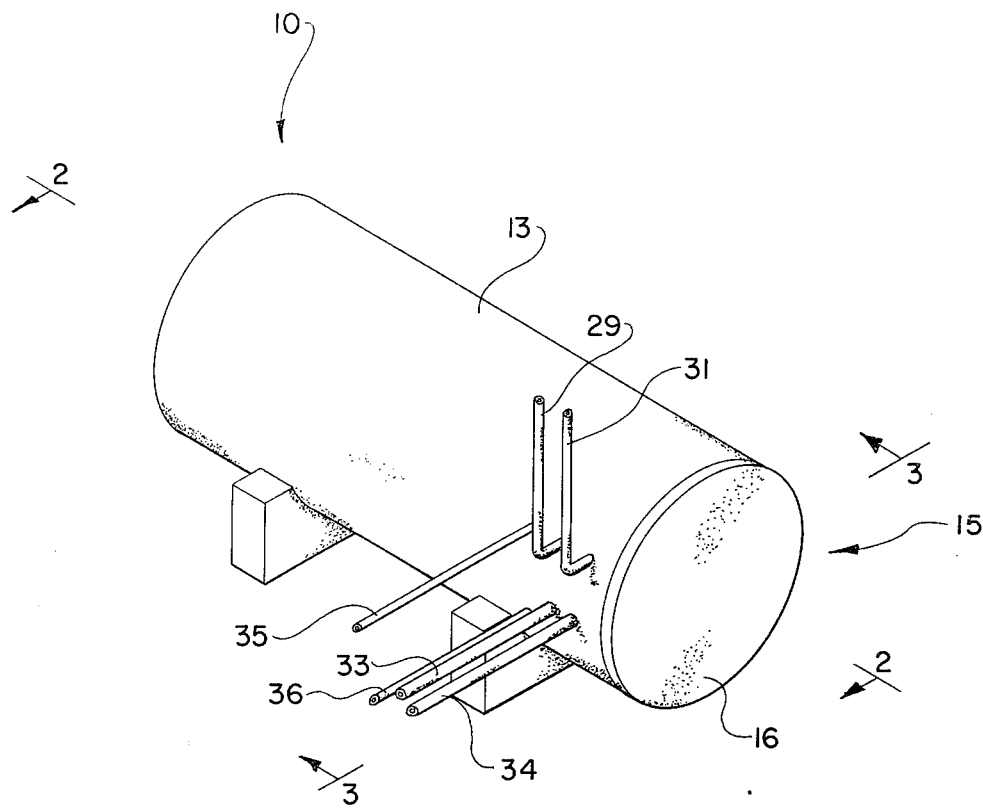
FIG. 1 is a perspective view of the heat storage reservoir of the present invention.

With further reference to the drawings, the heat storage reservoir of the present invention, indicated generally at 10, is composed of a tank portion 11 and a control portion 12. A generally cylindrical shaped insulated outer skin or shell 13 is provided about both the tank and control portions. The tank end of reservoir 10 is insulated integrally with insulation 13.

The control end of reservoir 10, indicated generally at 15, is in the form of a removable closure. The outer portion of this end or closure is insulated as indicated at 16. An inner portion 17 is provided which forms a shoulder 18 to assure a non-heat transferring juncture between closure 15 and insulated shell 13.

Figure 2:
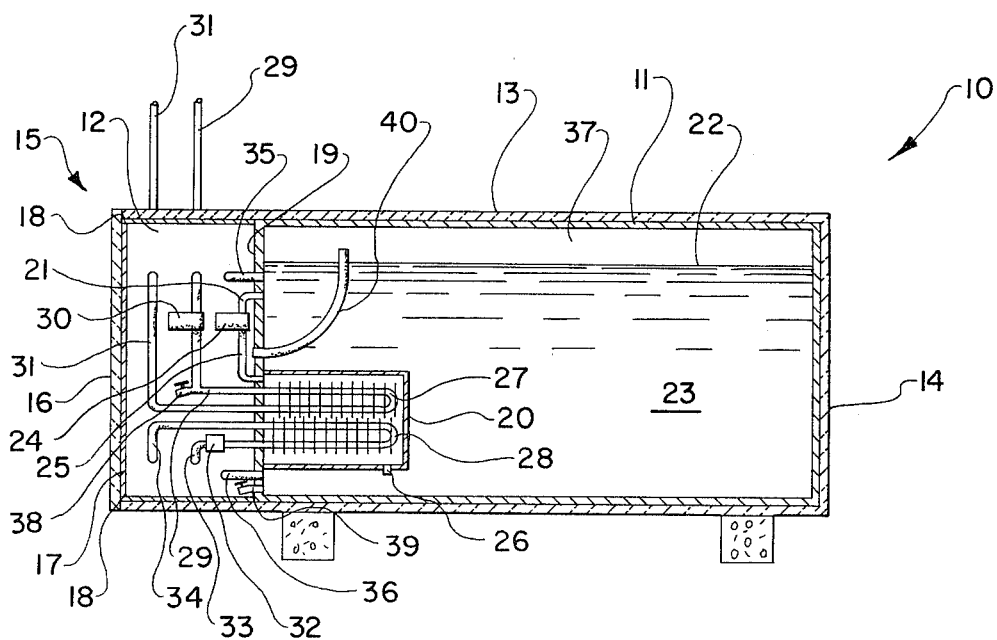
FIG. 2 is a sectional view in somewhat schematic form taken through lines 2—2 of FIG. 1.
Figure 3:
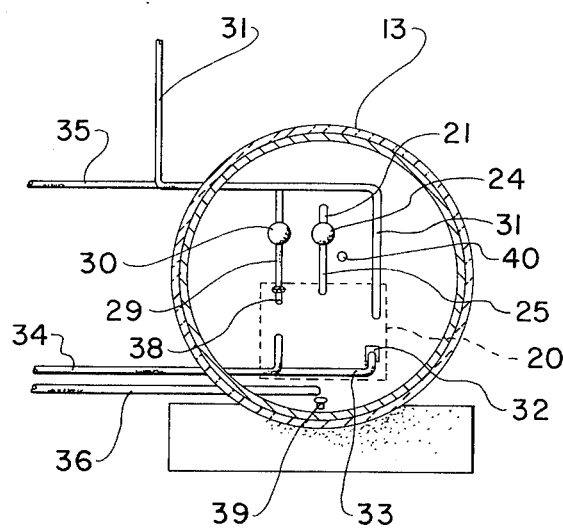
FIG. 3 is a sectional view taken through lines 3—3 of FIG. 1.

A liquid impervious partition 19 is provided between the tank and control portions 11 and 12 of reservoir 10. A heat exchange enclosure 20 is provided within tank portion 11 adjacent partition 19. Outlet line or tube 21 passes through the upper portion of partition 19 below the surface 22 of liquid 23. A pump means 24 is operatively connected to outlet line 21 on one side and to inlet line 25 on the other side as can clearly be seen in FIG. 2. The inlet line 25 communicates with the upper interior portion of heat exchange closure 20.

An outlet opening 26 is provided in the lower portion of closure 20. Thus it can be seen that when circulating pump 24 is operating, water or other liquid in the upper portion of tank 11 will be drawn off and circulated into the upper portion of enclosure 20. Since an amount of liquid equal to that being pumped in must be discharged from enclosure 20, circulation across heat exchange coils 27 and 28 from inlet 21 to outlet 26 is provided. Thus the problem of the heat build-up in the area adjacent the heat exchange coils being dissipated or dispersed by slow and sometimes erratic convection currents is eliminated and replaced by an extremely simple and yet highly efficient across coil circulating system.

Although coils 27 and 28 are both indicated as being provided within heat exchange enclosure 20, it is understood that these coils could be provided within separate enclosures with separate circulating pumps similar to that indicated at 24 being provided for each. Also, anytime the heat exchange function is being accomplished within either of the coils, pump 24 would be in operational mode.

The outlet line 29 of collector heat exchange coil 27 is operatively connected to collector pump 30. This pump pushes the heat exchange medium through the collector (solar or other type, not shown) with the return line 31 from the collector being connected back into coil 27.

If heat exchange coil 28 is used for purposes such as domestic hot water heating, then a flow control valve 32 would be provided in inlet line 33. Outlet line 34 would, of course, carry the flow from the heat exchange coil.

In applications of this type, the direction of flow could be reversed from that described at the pleasure of the person installing the same. The principle of operation of the same would, of course, be the same.

If the liquid 23 within tank 11 is to be used for purposes such as space heating, an outlet line 35 can be provided in the upper portion of partition 19 and a return line 36 in the lower portion thereof. This, of course, allows the warmer, upper liquid within tank 11 to be drawn off for use in the space heating system and returned to the lower or cooler portion of such tank.

Mounted adjacent the lower portion of partition 19 and communicating therethrough is tank fill/drain valve 39. Valves of this type and their operation are well known to those skilled in the art and further discussion of the same is not deemed necessary.

Passing from the interior of control portion 12 through partition 19 to a point in the upper portion of tank 11 and above the surface 22 of liquid 23 is a tube like emmersion air vent 40. Since the temperature of the air space 37 above liquid surface 23 is for all practical purposes the same as the air within control portion 12 (because both the tank and control portions are located within the same insulated shell), a static condition is created within vent 40 and no air will flow therethrough unless, of course, there is a change in relative atmospheric pressure. Since a static condition is established within the air vent, the liquid within tank 11 cannot dissipate through evaporation. This, of course, is an advantage in that tank 11 can act as a surge tank and yet does not have to be periodically replenished as do the tanks of prior art.

The pumps 24 and 30, the flow control valve 32, and any other heat generating devices used in the overall system in which the reservoir 10 is a part can be mounted within control portion 12 so that the heat generated during operation can be retained within the insulated shell of the reservoir. This heat retaining feature of the electrical and electromechanical controls will either help raise or maintain the temerature of the liquid 23 within tank portion 11 since water impervious partition 19 is not insulated and readily allows heat transfer from control to tank portions and vice versa.

Although the heat storage reservoir 10 has been described as being particularly adaptable for use in conjunction with solar energy systems, it is, of course, not limited to such applications.

In view of the above, it is obvious that the present invention has the advantage of providing a relatively simple and yet extremely efficient heat storage reservoir for use in conjunction with solar and other energy systems. The present invention includes not only improved heat exchange means but also a method of capturing and retaining heat normally dissipated into the ambient atmosphere. The present invention also provides for an emmersion air vent which allows atmospheric pressure to be maintained within the tank portion of the heat storage reservoir without loss of heat or liquid by evaporation.

The present invention may, of course, be carried out in other specific ways than those herein set forth without departing frm the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A heat storage means comprising: an insulated enclosure; a tank portion and an equipment portion disposed interiorly of said enclosure; an insulated, readily removable closure forming part of said insulated enclosure adjacent said equipment portion whereby ready access into said equipment portion is provided; a passive means to maintain substantial thermal equilibrium between said tank portion and said equipment portion in the form of a liquid impervious, heat conductive interface means separating such tank portion from such equipment portion; an immersion air vent extending through said interface into the upper portion of said tank portion to provide pressure equilibrium without loss of tank fluid through evaporation; and equipment means mounted within said equipment portion, at least a part of which is functionally designed to penetrate said tank portion through said interface and at least a part of which gives off heat during operation, said equipment, among other things, controlling heat transfer within said tank portion whereby a compact heat storage means is provided with substantial thermal equilibrium being maintained between said tank portion and said equipment portion.

2. The means of claim 1 wherein the equipment for controlling heat transfer is a heat exchanger.

3. The means of claim 1 wherein the equipment means includes at least one pump means.

4. The means of claim 1 wherein the equipment means include at least one flow control means.

5. The means of claim 1 wherein the equipment for controlling heat transfer is an enclosure disposed within said tank portion and having at least one heat exchange means operatively mounted therein.

6. The means of claim 5 wherein means are provided for circulating a fluid contained within said tank through said tank enclosure whereby more efficient heat transfer can be accomplished.

7. The means of claim 1 wherein at least one heat transfer means is operatively connected to a solar collector.

8. The means of claim 1 wherein at least one heat transfer means is operatively connected to a domestic type hot water supply.

9. The means of claim 1 wherein a means is provided for connecting said tank portion to a space heating system.

10. The means of claim 1 wherein the equipment for controlling heat transfer is operatively connected to a space heating line.

11. The means of claim 1 wherein the equipment means includes at least one flow control means.

* * * * *